United States Patent [19]

Carrick

[11] Patent Number: 5,255,933

[45] Date of Patent: Oct. 26, 1993

[54] WEIGHT DISTRIBUTING HULL AND KEEL SUPPORT FOR BOAT TRAILER FRAMES

[75] Inventor: Larry K. Carrick, Spokane, Wash.

[73] Assignee: Calkins Manufacturing Company, Spokane, Wash.

[21] Appl. No.: 831,366

[22] Filed: Feb. 3, 1992

[51] Int. Cl.$^5$ .................................................. B60P 3/10
[52] U.S. Cl. ................................................... 280/414.1
[58] Field of Search ................. 280/414.1, 414.3, 142; 414/529, 530, 531, 532, 533, 534, 535, 536; 193/35 F, 35 R, 35 TE

[56] References Cited

U.S. PATENT DOCUMENTS

| 1,906,288 | 5/1933 | Twomley | 193/35 F |
|---|---|---|---|
| 3,057,493 | 10/1962 | Cameron | 214/84 |
| 3,512,667 | 5/1970 | Calkins | 214/505 |
| 3,693,813 | 9/1972 | Calkins | 214/84 |
| 3,785,677 | 1/1974 | Calkins | 280/414 |
| 3,812,986 | 5/1974 | Rogers | 280/414.1 X |
| 3,888,367 | 6/1975 | Cox | 280/414.1 X |
| 3,917,087 | 11/1975 | Godbersen | 214/505 |
| 3,993,324 | 11/1976 | Carrick | 280/414 |
| 4,566,714 | 1/1986 | De Witt et al. | 280/142 X |
| 4,820,111 | 4/1989 | Godbersen | 280/414.1 |
| 4,893,828 | 1/1990 | Godbersen | 280/414.1 |
| 4,900,051 | 2/1990 | Godbersen | 280/414.1 |
| 5,060,963 | 10/1991 | Godbersen | 280/414.1 |

Primary Examiner—Margaret A. Focarino
Assistant Examiner—Peter C. English
Attorney, Agent, or Firm—Wells, St. John, Roberts, Gregory & Matkin

[57] ABSTRACT

In the present hull and keel support, a pair of cross members are pivoted about parallel horizontal fulcrum axes and extend transversely across a boat trailer frame. Each cross member includes a central keel receiver on one side of the associated fulcrum axis. Gimbal arrangements pivotably mount the hull engaging members and establish a first pivot axis parallel to the fulcrum axis, enabling the hull engaging members and keel supports to conform to a variety of boat hull configurations, while maintaining a desired weight distribution proportion between the keel receivers and hull engaging members. The hull engaging members also move about second pivot axes, substantially perpendicular to the fulcrum axes. In a first preferred form, the hull engaging members are elongated bunks mounted to pairs of gimbal mechanisms, a forward pair of which are slotted to permit deflection of the bunks. In another preferred form, hull engaging rollers are mounted at opposed ends of pivoted bars. The bars function as gimbals and are mounted to the cross members for pivotal motion about first pivot axes, spaced adjacent fulcrum axis opposite the keel receiver, and longitudinal second axes to facilitate adjustment and full contact with the boat hull. In another form, hull engaging rollers mount to flexible bunks to receive and deflect responsive to reception of a boat thereon.

26 Claims, 8 Drawing Sheets

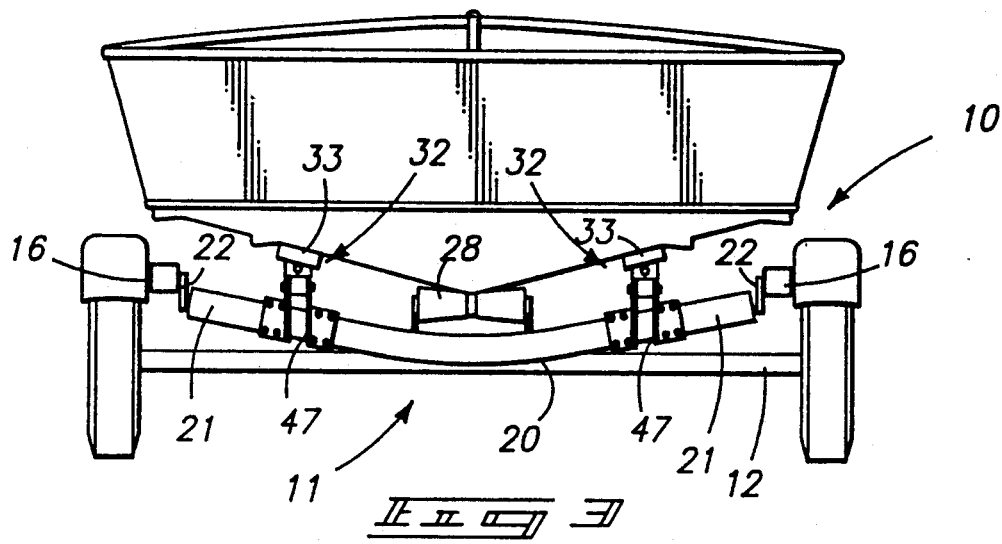
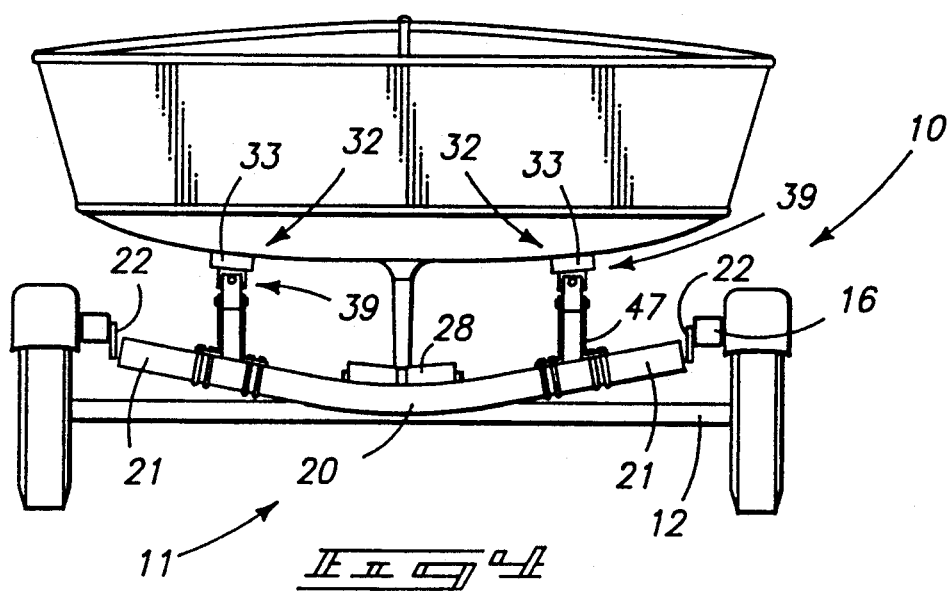

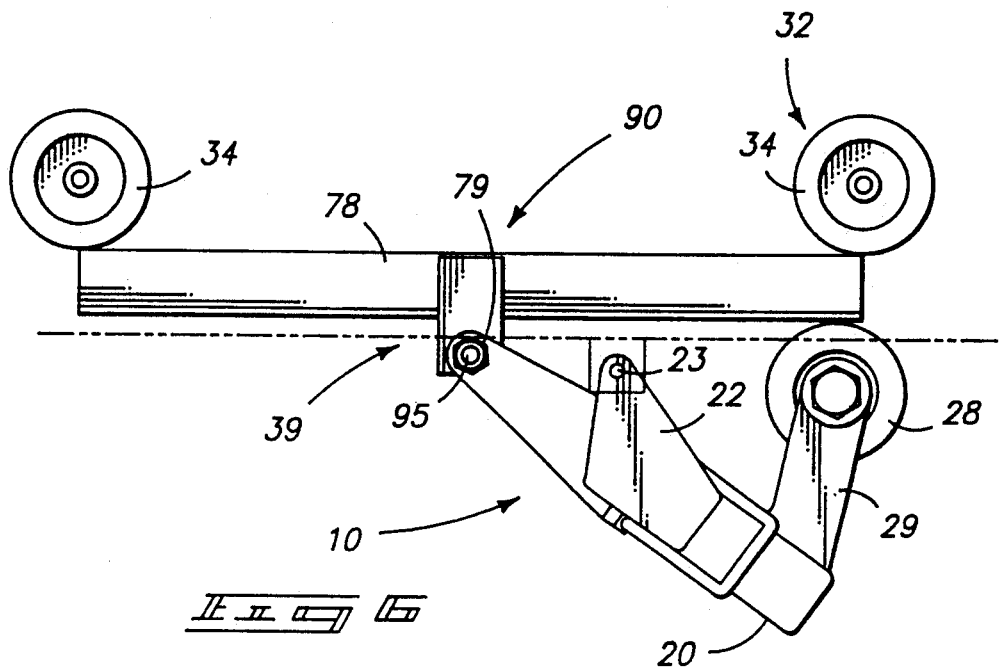
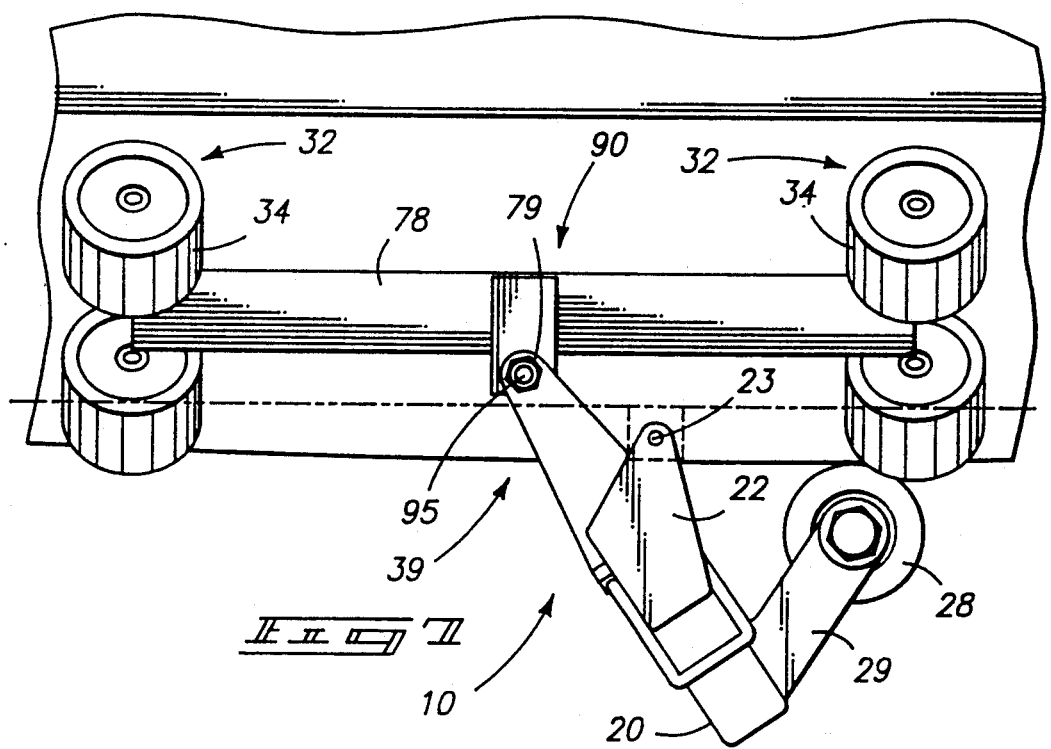

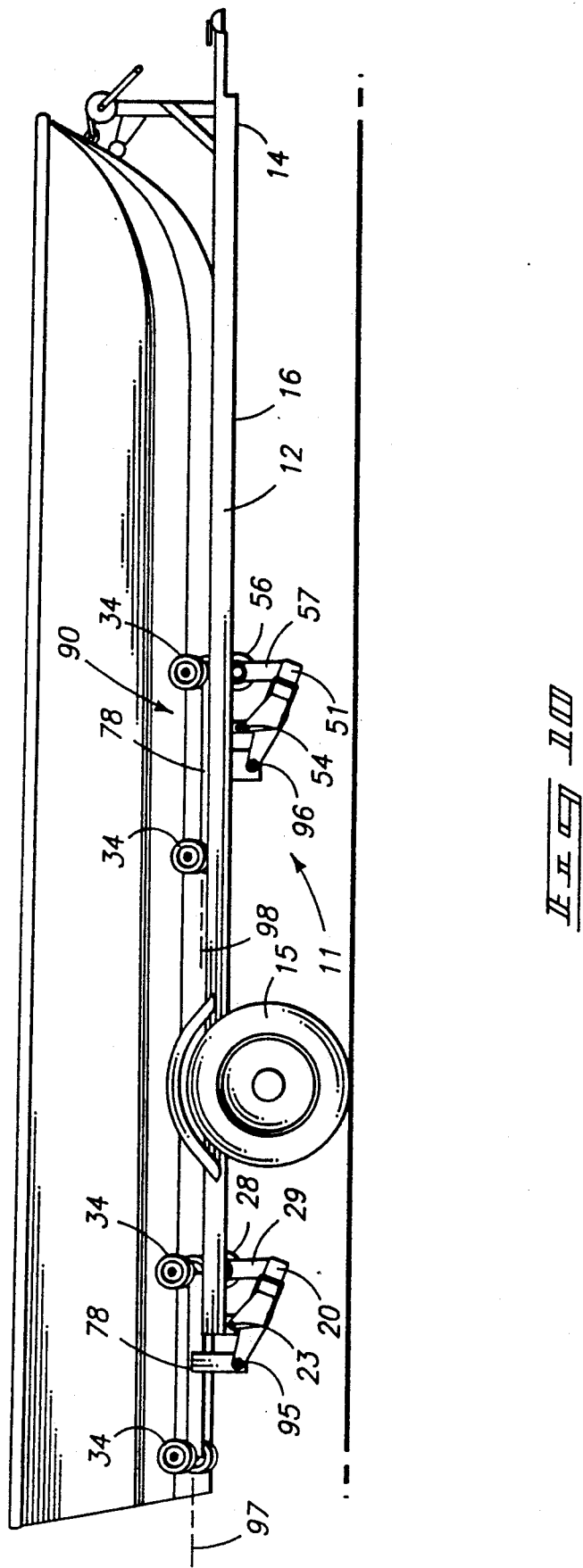

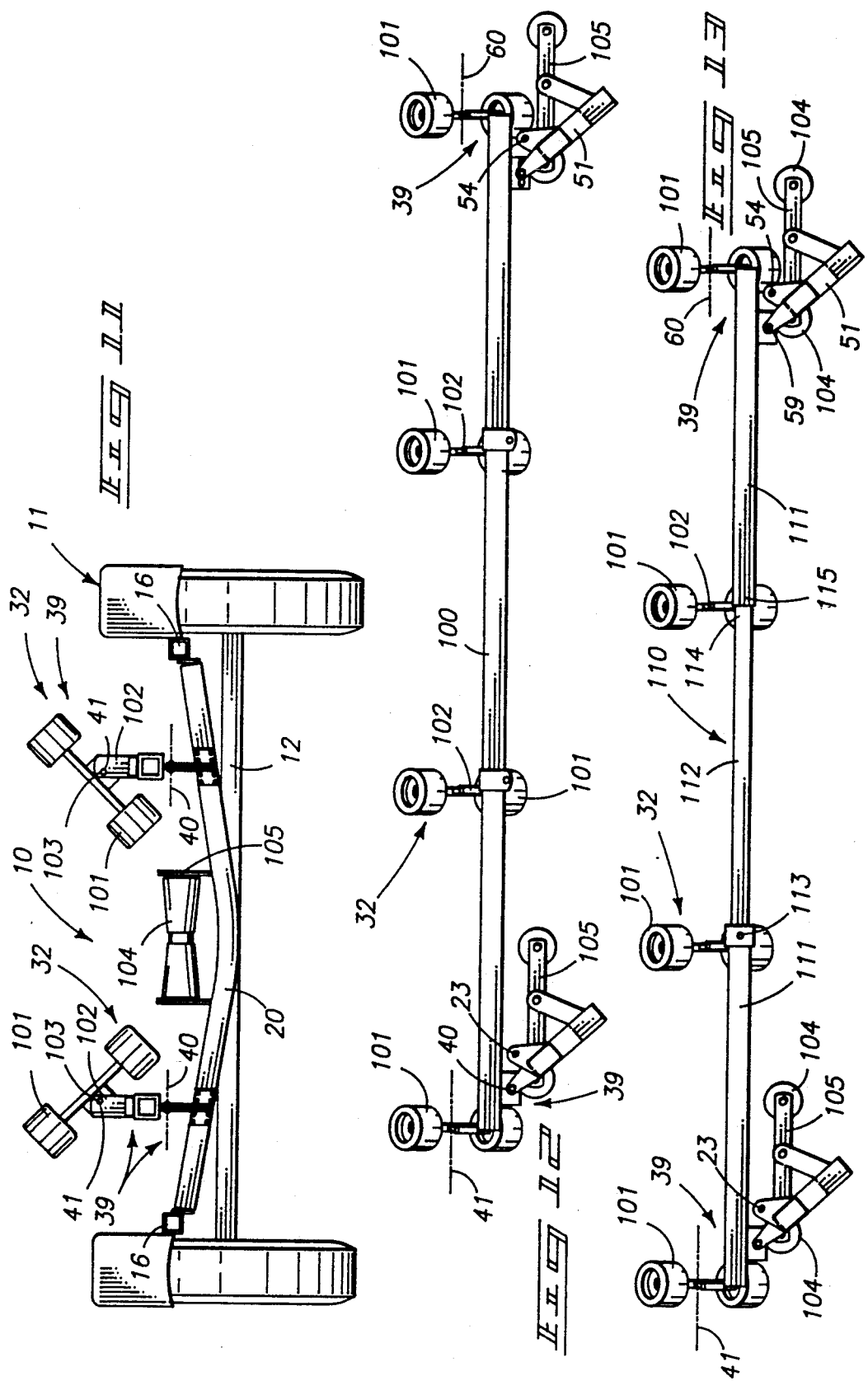

WEIGHT DISTRIBUTING HULL AND KEEL SUPPORT FOR BOAT TRAILER FRAMES

TECHNICAL FIELD

The present invention relates to boat transporting trailers, and more particularly to hull engaging and supporting elements for such trailers.

BACKGROUND OF THE INVENTION

Numerous boat trailers have been developed in the past with specific accommodations for receiving and distributing the weight of a boat between rollers or elongated "bunks" engaging the boat hull.

The keel area of a boat is typically designed to be relatively strong, while the hull areas are much more fragile. It is therefor desirable for the support devices in a boat trailer to engage the boat hull over a fairly large surface area to provide partial support and to support the remainder of the boat along the keel area.

It is undesirable to provide a large share of support along the keel, because the keel represents only a small fraction of the total surface area for potential support. Vibration and shock are concentrated in a much more confined area along the keel of a boat during transport and consequent damage is more prevalent when support is predominantly concentrated in the keel area. An "ideal" support will proportion the received weight of the boat in a desired relationship between keel supports and hull supports.

An attempt to provide improved support is disclosed in U.S. Pat. No. 3,512,667. The boat trailer in this patent includes self-centering or self-balancing cradle assemblies for hull engagement. Each cradle assembly is pivoted to the trailer framework about a transverse axis intermediate front and rear rollers that engage and carry a portion of the boat hull. Weight of the boat is balanced between the rollers on each cradle assembly. Two or more cradle assemblies are required to support a boat of any substantial size.

U.S. Pat. No. 3,785,677 discloses a weight distribution arrangement for boat trailers using single and multiple "walking beam" supports. The objective of this arrangement is to permit automatic self balancing through the hull supports during road travel.

The load support issue is also addressed in U.S. Pat. No. 3,993,324 with particular emphasis to supports using elongated flexible "bunks" for the purpose of supporting curved boat hulls, such as those on sailboats. This patent discloses a combination of longitudinal bunk support members, and walking beam supports. The bunks are mounted at rearward ends to the walking beam arrangement and at front ends to relatively fixed forward supports. The bunks are capable of pivotal motion about axes that extend substantially longitudinally with respect to the frame. The fixed nature of the forward mounts, however, limit the adaptability of the bunk support arrangement to various hull configurations.

Numerous other forms of trailer supporting apparatus have been provided in the past. Yet problems are still realized in the ability of the various trailers to adapt to numerous hull configurations for various boat styles and to apportion support between the hull and keel areas.

It is typical for adjustments to be made to the various hull engaging arrangements to adapt individual trailer configurations to a particular hull shape. Yet this adjustment often has an adverse effect on load distribution between the keel and hull supports on the trailer frame. Some trailers provide load distribution adjustment capability but do not adapt easily to different hull configurations. A need has therefore remained for a boat hull support arrangement that will automatically adapt to individual hull configurations while maintaining a desired weight support ratio between the hull and keel engaging members thereof.

BRIEF DESCRIPTION OF THE DRAWINGS

Preferred and alternate embodiments of the present invention are illustrated in the accompanying drawings, in which:

FIG. 3 is an end view of the boat and trailer with the support embodiment shown in FIGS. 1 and 2, and showing a first boat hull thereon;

FIG. 4 is an end view similar to FIG. 3, only showing the support formed to a different hull configuration;

FIG. 6 is a detail side elevation view of an alternate form of support;

FIG. 7 is a view similar to FIG. 6 only showing the alternate form of support in a loaded condition;

FIG. 10 is a side elevation view of a trailer and boat with the trailer incorporating the hull engaging support form shown in FIGS. 6-9;

FIG. 11 is an end view of a trailer with a further preferred form of hull engaging support;

FIG. 12 is a fragmented side view of the further preferred form of hull engaging support shown in FIG. 11; and FIG. 13 is a view similar to FIG. 12 only showing a modified bunk arrangement.

DETAILED DESCRIPTION OF THE PREFERRED EMBODIMENTS

Figure 1:
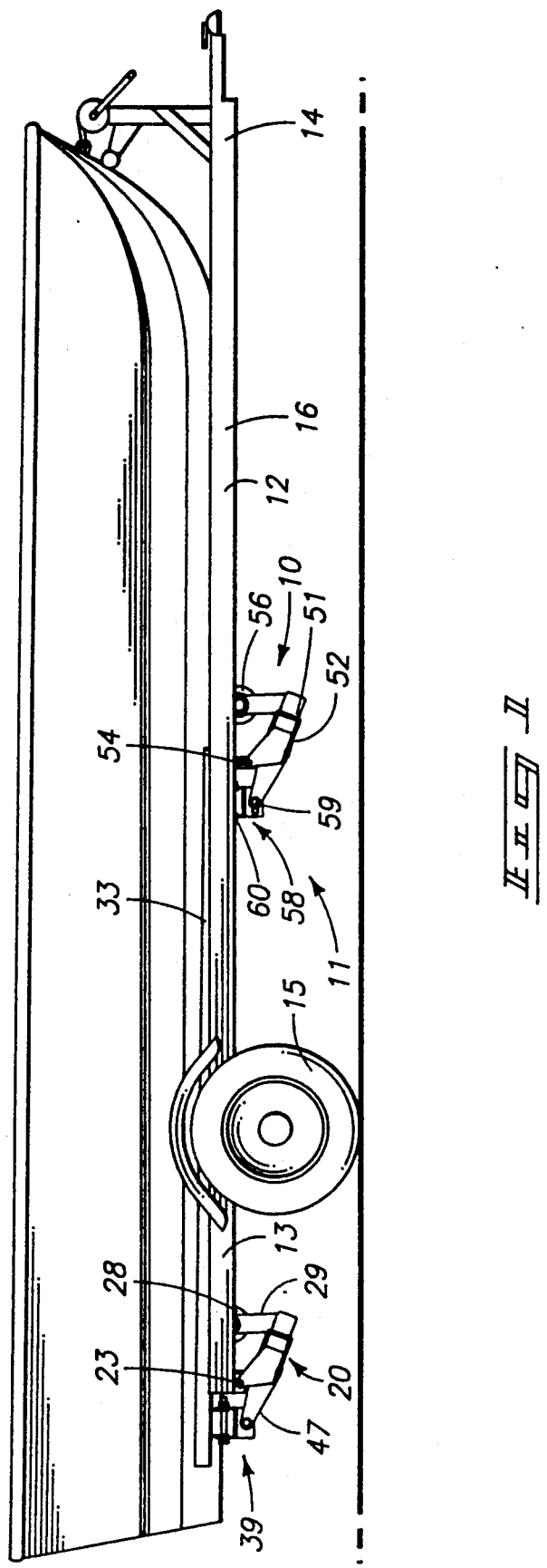
FIG. 1 is a side elevation view of a boat and trailer incorporating features of a first preferred form of the present hull and keel support.

This disclosure of the invention is submitted in furtherance of the constitutional purposes of the U.S. Patent Laws "to promote the progress of science and useful arts" (Article 1, Section 8).

A trailer embodying aspects of the present invention is shown in the accompanying drawings and is designated therein by the reference numeral 11. The boat trailer 11 incorporates an elongated rigid framework 12 that serves to mount the present hull and keel support generally designated at 10.

There are three preferred forms of the present support 10 shown herein. A first preferred form of support 10 is shown in FIGS. 1-5. A second preferred form of support 10 is shown in FIGS. 6-10, and a third preferred form is shown in FIGS. 11 and 12.

For purposes of further description of the hull and keel support 10, a brief description will be given with regard to the boat trailer frame 12. Briefly, the boat trailer 11 will typically include an elongated frame 12 extending between a rearward end 13 and a forward end 14. The trailer should be supported by wheels 15 and include transversely spaced longitudinal frame side members 16. Further details of the trailer frame will not be given, it being understood that such frames are well known to the industry. The present hull and keel support may be utilized for a variety of such conventional boat trailer frame configurations.

Before describing details, discussion will first be directed to elements that all preferred embodiments of the present invention have in common. In general, all exemplified forms of the invention include a rigid rearward cross member 20 extending between opposed ends 21 (FIGS. 3, 4, 8, and 9) that are mounted by brackets 22 to the elongated trailer frame side members 16. The brackets 22 are mounted by bolts or other appropriate pivot connectors to facilitate pivotal motion of the cross member about a horizontal fulcrum axis 23 (FIGS. 2, 5, 11) that is transverse to the longitudinal orientation of the frame 12.

In the illustrated examples of the present invention, a keel receiver 28 is mounted to the rearward cross member 20 by means of a bracket 29 (FIGS. 2, 5, 6, 7, and 12). The keel receiver 28 is advantageously in the form of a roller or pairs of rollers that are mounted to one side of the fulcrum axis 23. The keel receiver 28 is positioned substantially centrally on the cross member 20 to receive and provide moveable support to a boat keel.

The exemplified forms also include hull engaging members 32. The hull engaging members 32 are situated on the rearward cross member 20 and are laterally spaced from the keel receiver 28. It is preferred that at least one pair of the hull engaging members be provided, with each member of the pair being spaced a lateral distance from the keel receiver 28.

The configuration of the hull engaging members 32 vary with the embodiments of the invention. In the first preferred form of the invention, the hull engaging members 32 include elongated flexible bunks 33. The bunks 33 extend along and are substantially parallel to the side members 16 of the boat trailer. In the second preferred form, the hull engaging members 32 include rollers 34 to engage the boat hull surfaces. In a third preferred form, the hull engaging members 32 include sets of hull engaging rollers 35 pivotably mounted along flexible bunk members 36.

In the various configurations, gimbal means 39 are provided for each hull engaging member 32. Each gimbal means 39 mounts an adjacent hull engaging member or members 32 to the cross member 20 for pivotal motion about first and second pivot axes. Each gimbal means on the rearward cross member 20 includes a first pivot axis 40 substantially parallel to the fulcrum axis 23, and a second pivot axis 41 that is substantially perpendicular to the fulcrum axis 23 and the first pivot axis 40. The second pivot axes 41 are advantageously horizontal and oriented longitudinally with respect to the elongated boat trailer frame 12.

Figure 2:
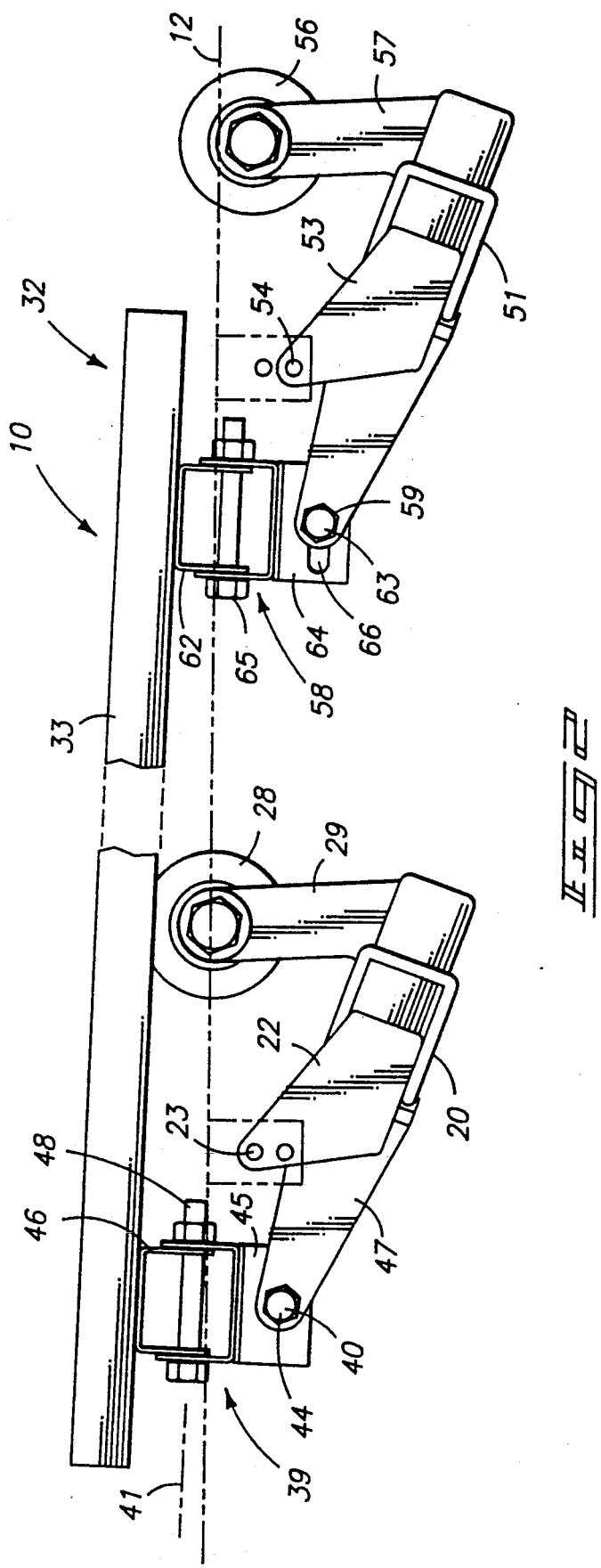
FIG. 2 is an enlarged side elevation detail view of a fragmented first preferred support arrangement.
Figure 5:
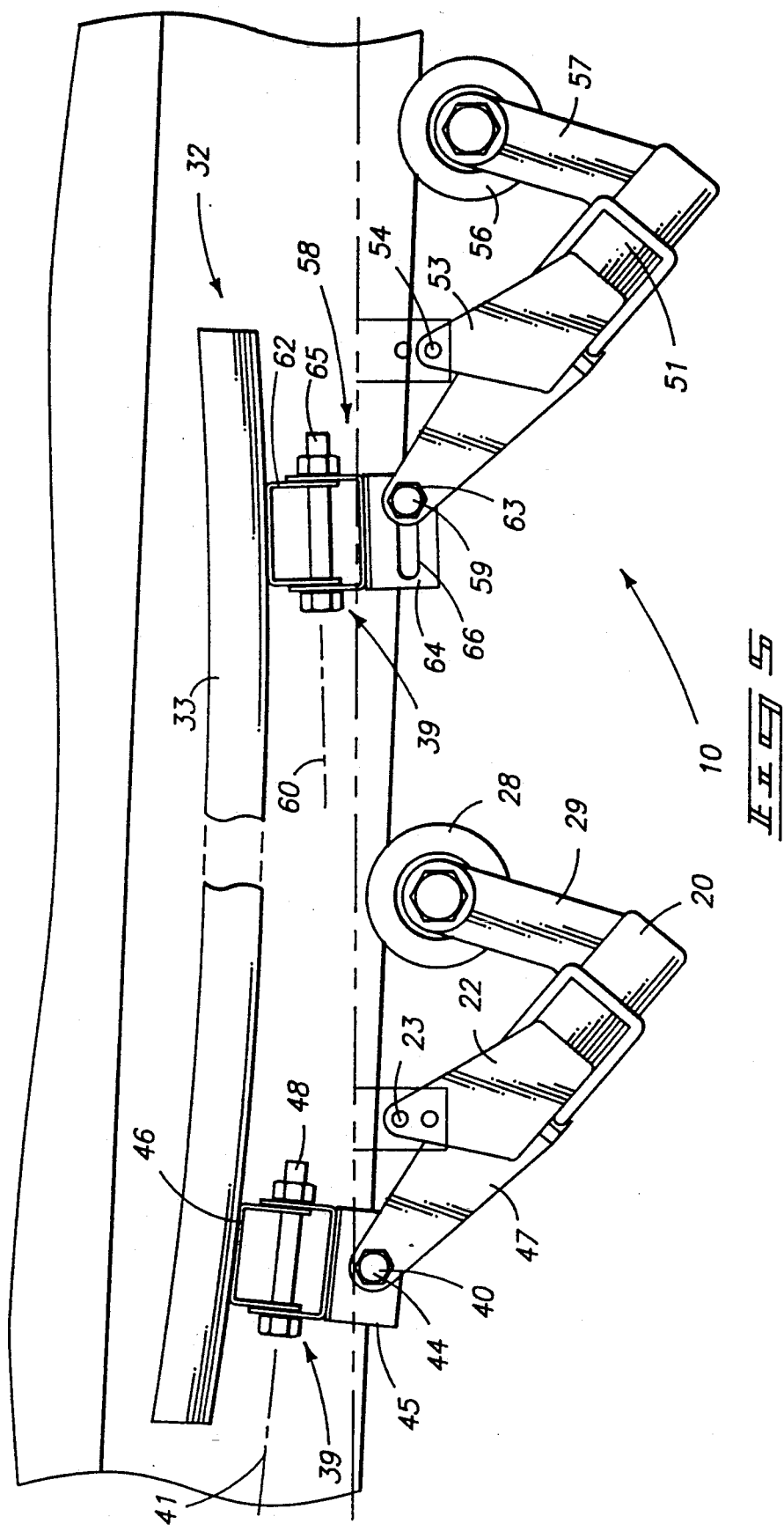
FIG. 5 is a view similar to FIG. 2 only showing the support loaded.
Figure 8:
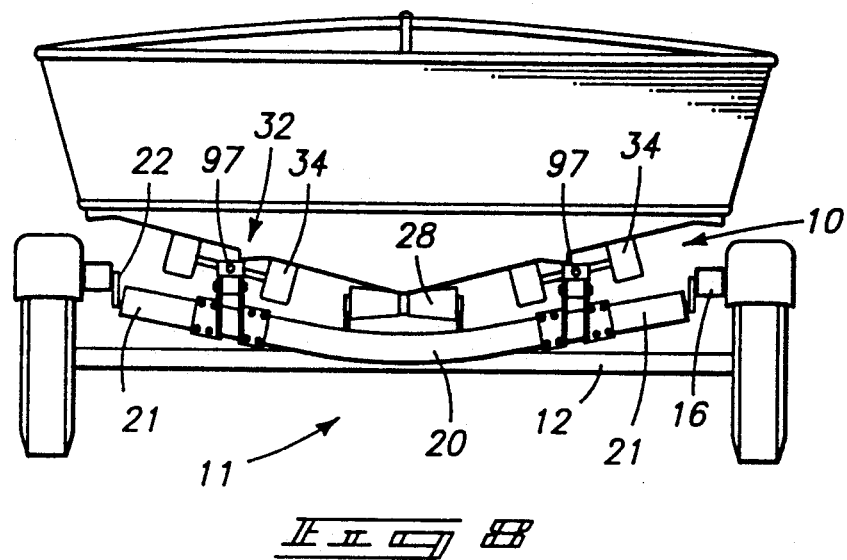
FIGS. 8 and 9 are views similar to FIGS. 3 and 4 with the support form shown in FIGS. 6 and 7.
Figure 9:
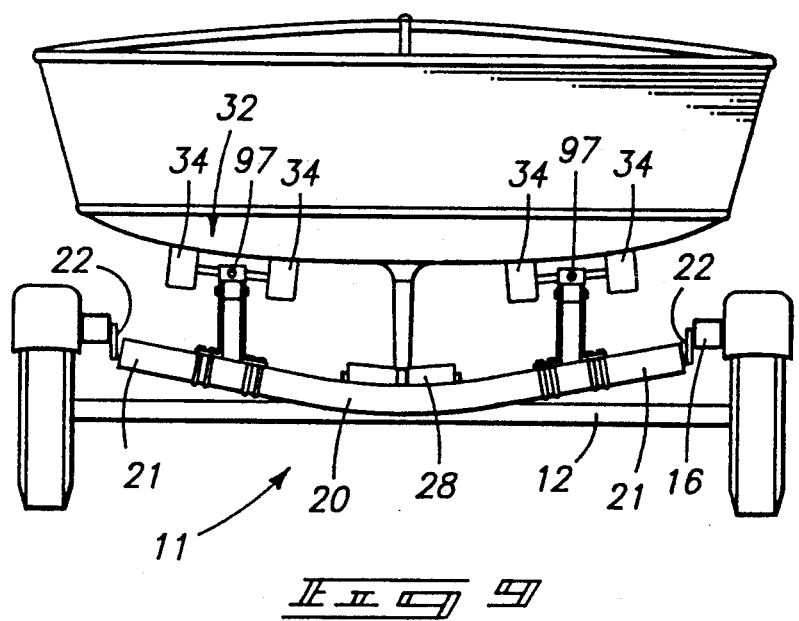

In the first preferred embodiment, the gimbal means 39 include pins 44 that define the first pivot axis 40 (FIGS. 2, 5). These pins 44 connect pairs of gimbal brackets 45, 46 to brackets 47 which are mounted to the cross members 20, for pivotal motion about the first pivot axis. Pins 48 define the second pivot axes 41 and mount the brackets 45, 46 to the cross member 20.

As may be seen in FIGS. 3, 4, the gimbal means 39 are provided in pairs on the cross member 20, spaced to opposite lateral sides of the keel receiver 28. Further, as can be seen in FIGS. 2, 5, the first pivot axis 40 is situated from the fulcrum axis 23 to a side thereof opposite that of the keel receiver 28.

It is of interest to note that the relative distances between the keel receiver 28 to the fulcrum axis 23 and the first pivot axis 40 to the fulcrum axis 23 determines the proportion of weight supported on the respective hull engaging members 32 and keel receiver 28.

By way of example, it has been found to be advantageous to space the keel receiver 28 to a side of the axis such that the keel receiver will bear approximately forty percent of the weight of the boat while the hull engaging members bear approximately sixty percent of the load against the first pivot axes. This relationship may be changed as desired simply by adjusting the spacing of either or both of the hull engaging members and keel receiver from the fulcrum axis.

It is also of significance to note that the first pivot axis 40 is parallel to the horizontal fulcrum axis 23. By this provision, the first axis will always remain in a horizontal orientation regardless of the pivoted position of the cross member 20. Thus, the hull engaging members 32 may remain in an angular orientation capable of intimate contact with the boat hull, at any pivoted position of the cross member 20 and the keel receiver 28. This feature thus lends the ability for the present support system to instantaneously adapt to various boat hull configurations.

In the preferred forms, a second forward cross member 51 (FIGS. 2, 5, 10) is provided, extending between opposed ends 52. Mounting brackets 53 are provided at the ends to mount the second cross member 51 for pivotal motion about a second fulcrum axis 54. The second fulcrum axis 54 is parallel to the first fulcrum axis 23. Axis 54, like the fulcrum axis 23, is preferably horizontal, and transverse to the longitudinal orientation of the elongated frame 12.

A keel receiver 56 is provided on the second cross member 51 at the center thereof and is mounted by brackets 57 to one side of the fulcrum axis 54. Second gimbal means 58 are also provided, defining first and second pivot axes 59, 60 that are analogous to the axes 41, 44 described above. The axes 59, 60 are defined respectively by pins 63 and 65 extending through (in the first preferred form) mating, paired gimbal brackets 62, 64 (FIGS. 2, 5).

Brackets 64 in the first preferred form (FIGS. 2, 5) include longitudinal slots 66. Slots 66 function as means for permitting longitudinal deflection of the hull engaging members (bunks 33) responsive to loading and deflection thereof against the hull surface of a boat.

This feature may be clearly understood by comparing FIGS. 2 and 5. The pin 59 in FIG. 2 is shown substantially midway along the slot 66 with the bunk unloaded. In FIG. 5, the bunk is shown arched under a loaded condition, such that the longitudinal spacing between the gimbal brackets at the opposite ends of the bunk 33 is foreshortened.

The slot 66 accommodates the foreshortening by allowing the bracket to slide rearwardly on pin 59. The capability for the bunk to pivot about the second axes of pins 47, 65 remains the same in both conditions. Further, the load bearing relationship between the bunk and the keel receiver 28, 56 remains the same.

The bunks 33 are therefore free to deflect along their lengths within reasonable limits, by provision of the slots 66. Yet the bunks 33 are moveable through an arc defined by the fulcrum axes 23, 54 of cross members 20 and 51 to vary elevational distances between the bunks 33 and the keel receivers 28, 56 and thereby automatically adjust for hulls of various depths.

Additionally, the pins 48, 65 which define the second pivot axis, permit pivotal motion of the bunks 33 about longitudinal pivot axes to still further enable adjustment of the bunk positions with respect to the boat hull configuration.

The various axes and the relationships thereof facilitate a wide variety of positioning for the bunk members and keel receivers to accommodate a similar variety of hull configurations.

Weight distribution between the hull engaging members and the keel receivers will always remain within a selected ratio. For example, should a weight distribution be desired as described above (forty percent for the keel receivers 28, 56 and sixty percent for the hull engaging members 32), that relationship will remain consistent regardless of the elevational spacing between the keel supports and hull engaging members. Thus the same weight distribution will be afforded to a relatively deep, "v" hull configuration, or to a sailboat with a relatively deep keel (FIG. 4), or to a boat having a flat or shallow hull as shown in FIG. 3. The hull engaging members and keel receivers conform closely to the hull and keel while weight distribution remains consistent. These relationships hold true for the second preferred form described in more detail below.

The second preferred configuration is illustrated in FIGS. 6-10 includes identical forward and rearward cross members 20, 51 keel receivers 28, 56, fulcrum axes 23, 54 and other elements similar to those described for the first preferred form. The difference is in the hull engaging members 32 (FIGS. 6, 7, 10) and a gimbal means 90. Here, the gimbals 90 include longitudinal bars 78 mounted by pivots 79 to the cross members 20, 51 and that define the first pivot axes 95, 96 (FIG. 10). The first pivot axes, as described earlier, are parallel to the associated fulcrum axes 23, 54 of the cross members 20, 51.

Gimbal means 90 of the second preferred form include the bars 78, and pivots 79 between the bars 78 and the brackets on cross members 20, 51. Further, each rearward and forward gimbal means 90 includes a pivot connection between the rollers 34 and the bar 78 defining second pivot axes 97, 98 (FIG. 10) that are analogous to the second pivot axes 41, 60 of the first preferred form.

The second pivot axes 97, 98 permit pivotal motion of the roller sets to adapt to various hull configurations, while the first pivot axes 95, 96 and fulcrum axes 23, 54 define pivotal motion of the bars 78 and cross members 20, 51 to accept the depth dimension of the boat hull and keel.

This is all accomplished as described for the first preferred form while the hull engaging rollers 34 and keel supports 28, 56 maintain a prescribed weight distribution relationship. This relationship is maintained through various hull configurations as may be evidenced by comparing FIGS. 6 and 7.

As may be seen in FIG. 10, two sets of the bars and related cross members, hull engaging rollers, etc. are provided along the frame. Additional sets may also be provided depending upon the length of the boat to be carried. Each of the assemblies may be substantially identical.

Referring now to FIGS. 11-12, a combination of the above described embodiments is shown. There a pair of elongated flexible bunks 100 are shown, each mounting a set of hull engaging rollers 101. The rollers 101 are mounted to the bunks 100 for free pivotal movement about second pivot axes as determined by pivot brackets 102 and pivot pins 103 mounting the rollers 101 to the bunk members 100. The second pivot axes are, like the second pivot axes described above, substantially parallel to the boat frame and normally horizontal.

The flexible nature of the bunk members 100 is similar to that shown in FIG. 5, where the bunk shown therein is flexed responsive to the applied weight and shape of the received boat hull. The FIGS. 11-12 version, however mounts rollers 101 on the bunks to receive the hull and apply bending forces to the bunks 100. Thus the advantage of accurate deflection of the bunks responsive to the received weight and hull shape is realized, along with the rollers 101 which intimately engage the hull and roll freely to facilitate loading and unloading of a boat.

The cross members, fulcrum axes, and first pivot axes and the associated hardware of the version shown in FIGS. 11, 12 may remain substantially identical to those described for the first preferred embodiment described above. An exception is an alternate form of the keel receiver as shown. Here a pair of keel engaging rollers 104 are mounted to a bar 105 which in turn is mounted at its midpoint to the adjacent cross member. Weight applied to the rollers 104 is transmitted directly to the mid mounting point of the bar 105 at the selected distance from the associated fulcrum axis. Weight or load distribution may thus be similar or identical to that shown in, say FIG. 5 where only one keel engaging roll 28, 56 is shown for each cross member 20, 51. It is pointed out that the dual keel engaging rollers 104 may also be substituted for the keel rolls 28, 56 of the embodiments previously described.

FIG. 13 illustrates a variation of the bunk member 100 shown in FIGS. 11, 12. In this form, bunks 110 are provided in slidably joined segments. Rigid end channels 111 are provided to mount the rollers 101. The rigid end channels 111 are pivotably mounted to their respective cross members 20, 51. A flexible spring member 112 is mounted by a fastener 113 at one end to one of the channels 111 and has a remaining end 114 is slidably received within an open end or socket 115 in the other channel 111.

The free end of the spring member 112 slides within the other channel 111 responsive to deflection of the channels 111 about the respective fulcrum axes, thereby allowing the bunks 110 to flex similarly to the bunks 33 or 100. This arrangement does away with the need for the slots 66 (FIG. 5), since bunk length change due to flexion on loading is accommodated by the free sliding contact between the spring member 112 and the associated channel 111.

Operation of the present invention is relatively automatic, occurring as the associated boat is loaded onto or removed from the trailer. As the boat is loaded onto the trailer, the hull will engage either the hull engaging members 32 or the keel receiver 28 of the rearward set. It is not consequential as to which engages first. Whichever members first engage the boat, the remainder of the assembly will automatically swing into position such that the remaining hull or keel engaging member will come into contact with the boat and immediately bear its portion of the weight applied by the boat hull.

The load distribution proportions will be maintained throughout loading, transport, storage, and unloading conditions due to the consistent geometry of the relative pivot points and the fulcrum axes. Additionally, the hull engaging members will consistently move into flush, intimate contact with the adjacent hull surfaces due to the orientation of the first pivot axes (being parallel with the fulcrum axes), and the longitudinal second pivot axes. The intersecting first and second pivot axes enable pivotal motion of the hull engaging members to any reasonable position, thereby allowing the bunks or support rollers to fully contact the adjacent hull configuration.

In compliance with the statute, the invention has been described in language more or less specific as to features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A weight distributing hull and keel support for an elongated boat trailer frame, comprising:
   first and second cross members mounted to the boat trailer frame for pivotal movement thereon about first and second fulcrum axes transverse to the boat trailer frame and spaced apart longitudinally thereon;
   a keel receiver on each cross member extending to one side of the associated fulcrum axis;
   hull engaging members on each of the cross members, laterally spaced from the associated keel receiver;
   gimbal means between the hull engaging members and cross members, mounting the hull engaging members for pivotal motion about first pivot axes arranged parallel to the fulcrum axes, and second pivot axes perpendicular to the fulcrum axes, to enable flush contact with a variety of boat hull configurations by the hull engaging member, the gimbal means including longitudinal displacement means for permitting longitudinal movement of the hull engaging members relative to the boat trailer frame, the longitudinal displacement means having elongated slot means for slidably connecting the hull engaging members to one of the cross members; and
   wherein the first pivot axes of the gimbal means are spaced from the respective fulcrum axes opposite the respective keel receivers such that the weight of a boat hull received on the hull engaging members and keel receivers is proportioned according to the respective distances of the hull engaging members and keel receivers from the respective fulcrum axes to thereby effect the percentage of the load carried by the keel receivers and associated hull engaging members.

2. A weight distributing hull and keel support for a boat trailer frame, as claimed by claim 1 wherein the gimbal means each includes paired gimbal brackets and first and second pivot pins respectively defining the first and second pivot axes.

3. A weight distributing hull and keel support for a boat trailer frame, as claimed by claim 1 wherein the hull engaging members and the keel receivers are arranged with respect to the fulcrum axes to engage a boat hull and keel in such a manner that approximately sixty percent of the received boat weight is received by the hull engaging members and approximately forty percent of the received boat weight is received by the keel receivers.

4. A weight distributing hull and keel support for a boat trailer frame, as claimed by claim 1 wherein each hull engaging member is comprised of hull engaging rollers and wherein each gimbal means includes a bar mounted to the cross member for pivotal movement about the associated first pivot axis and wherein the hull engaging rollers are mounted to the bar for pivotal movement about the associated second pivot axis.

5. A weight distributing hull and keel support for a boat trailer frame, as claimed by claim 1 wherein each hull engaging member is comprised of hull engaging rollers and wherein each gimbal means is comprised of a bar mounted to the associated cross member for pivotal movement about the associated first pivot axis and a bracket mounting the hull engaging rollers to the bar for pivotal movement about the associated second pivot axis; and
   wherein the hull engaging rollers are spaced apart along the bar to opposite sides of the associated first axis.

6. A weight distributing hull and keel support for an elongated boat trailer frame, comprising:
   first and second cross members mounted to the boat trailer frame for pivotal movement thereon about first and second fulcrum axes transverse to the boat trailer frame and spaced apart longitudinally thereon;
   a keel receiver on each cross member extending to one side of the associated fulcrum axis;
   hull engaging members on each of the cross members, laterally spaced from the associated keel receiver, the hull engaging members including elongated hull engaging bunks extending longitudinally between the cross members;
   gimbal means between the hull engaging members and cross members, mounting the hull engaging members for pivotal motion about first pivot axes arranged parallel to the fulcrum axes, and second pivot axes perpendicular to the fulcrum axes, to enable flush contact with a variety of boat hull configurations by the hull engaging member, the gimbal means including longitudinal displacement means for permitting longitudinal movement of the hull engaging members relative to the boat trailer frame; and
   wherein the first pivot axes of the gimbal means are spaced from the respective fulcrum axes opposite the respective keel receivers such that the weight of a boat hull received on the hull engaging members and keel receivers is proportioned according to the respective distances of the hull engaging members and keel receivers from the respective fulcrum axes to thereby effect the percentage of the load carried by the keel receivers and associated hull engaging members.

7. A weight distributing hull and keel support for a boat trailer frame, as claimed by claim 6 wherein the hull engaging members include hull engaging rollers mounted to the bunks.

8. A weight distributing hull and keel support for a boat trailer frame, as claimed by claim 6 wherein the bunks are comprised of:
   rigid end channels mounted to the cross members for pivotal movement thereon about the first pivot axes; and
   a flexible bar joining the rigid end channels together.

9. A weight distributing hull and keel support for a boat trailer frame, as claimed by claim 6 wherein the hull engaging bunks extend longitudinally forward from the gimbal means on the first cross member to the gimbal means on the second cross member.

10. A weight distributing hull and keel support for an elongated boat trailer frame, comprising:

first and second cross members mounted to the boat trailer frame for pivotal movement thereon about first and second fulcrum axes transverse to the boat trailer frame and spaced apart longitudinally thereon;

a keel receiver on each cross member extending to one side of the associated fulcrum axis;

hull engaging members on each of the cross members, laterally spaced from the associated keel receiver, the hull engaging members including elongated flexible bunks extending longitudinally between the cross members, and wherein the bunks are comprised of:

rigid end channels mounted to the cross members for pivotal movement thereon about the first pivot axes;

a flexible bar joining the rigid end channels together; and wherein the flexible bar is affixed at one end to one of the rigid end channels and is slidably joined at a remaining end to the remaining rigid end channel;

gimbal means between the hull engaging members and associated cross members, mounting the hull engaging members for pivotal motion about first pivot axes arranged parallel to the fulcrum axes, and second pivot axes perpendicular to the fulcrum axes, to enable flush contact with a variety of boat hull configurations by the hull engaging member; and wherein the first pivot axes of the gimbal means are spaced from the respective fulcrum axes opposite the respective keel receivers such that the weight of a boat hull received on the hull engaging members and keel receivers is proportioned according to the respective distances of the hull engaging members and keel receivers from the respective fulcrum axes to thereby effect the percentage of the load carried by the keel receivers and associated hull engaging members.

11. A weight distributing hull and keel support for an elongated boat trailer frame, comprising:

a pair of cross members spaced apart longitudinally along the boat trailer frame and mounted thereto for pivotal movement about parallel horizontal fulcrum axes transverse to the boat trailer frame;

a keel receiver on each cross member extending to one side of the respective fulcrum axis;

a pair of elongated flexible hull engaging bunk members;

a pair of gimbal means on each cross member, with each gimbal means mounting an end of a hull engaging bunk member such that the hull engaging bunk members extend longitudinally between the cross members for deflection about the fulcrum axes and for deflection about first pivot axes arranged parallel to the fulcrum axes, and second pivot axes perpendicular to the fulcrum axes, the gimbal means including longitudinal displacement means for permitting longitudinal movement of the hull engaging bunk members relative to the boat trailer frame; and wherein the first pivot axis of each gimbal means is spaced from the respective fulcrum axis of the associated cross member to a side thereof opposite the respective keel receiver of the associated cross member such that the weight of a boat hull received on the hull engaging bunk members and keel receivers will be proportional according to the respective distances of the first pivot axes and keel receivers from the respective fulcrum axes.

12. A weight distributing hull and keel support for a boat trailer frame having a forward end and a rearward end, as claimed by claim 11 wherein the gimbal means are provided in forward and rearward pairs, and wherein one of the gimbal means pairs includes gimbal brackets connected by first and second pivot pins respectively defining the first and second pivot axes, mounting the hull engaging bunk members to the associated cross member; and wherein the longitudinal displacement means comprises longitudinal slots formed in the gimbal brackets, for receiving the first pivot pins and to permit longitudinal deflection of the bunk members.

13. A weight distributing hull and keel support for a boat trailer frame having a forward end and a rearward end, as claimed by claim 11 wherein the gimbal means include forward gimbals and rearward gimbals, and wherein the forward gimbals include paired gimbal brackets connected by first and second pivot pins respectively defining the first and second pivot axes, mounting the hull engaging bunk members to the associated cross member; and wherein the longitudinal displacement means comprises longitudinal slots formed in the gimbal brackets, for receiving the first pivot pins and to permit longitudinal deflection of the bunk members.

14. A weight distributing hull and keel support for an elongated boat trailer frame, comprising:

a pair of cross members spaced apart longitudinally along the boat trailer frame and mounted thereto for pivotal movement about parallel horizontal fulcrum axes transverse to the boat trailer frame;

a keel receiver on each cross member extending to one side of the respective fulcrum axis;

a pair of elongated flexible bunk members extending between and mounted to the pair of cross members;

hull engaging rollers;

gimbal means mounting the hull engaging rollers to the bunk members and cross members for pivotal movement thereon about first and second pivot axes, wherein the gimbal means includes first and second sets of gimbal bracket pairs mounted between the bunk members and cross members to permit pivotal motion of the bunk members about the first pivot axes and the fulcrum axes, and wherein one set of the gimbal bracket pairs includes slot means for permitting longitudinal motion of the bunk members attached thereto;

wherein the second pivot axes are oriented longitudinally with respect to the trailer frame; and wherein the first pivot axes of the gimbal means are spaced from the respective fulcrum axes of the associated cross members opposite the respective keel receivers of the associated cross members such that the weight of a boat hull received on the hull engaging rollers and keel receivers will be proportional according to the respective distances of the first pivot axes and keel receivers from the respective fulcrum axes.

15. A weight distributing hull and keel support for a boat trailer frame, as claimed by claim 14,
further comprising sets of bars mounted to the bunk members for pivotal motion about the longitudinal second axes;
the hull engaging rollers being mounted to the sets of bars for rotation against a boat hull.

16. A weight distributing hull and keel support for an elongated boat trailer frame, comprising:
first and second cross members mounted to the boat trailer frame for pivotal movement thereon about first and second fulcrum axes transverse to the boat trailer frame and spaced apart longitudinally thereon;
a keel receiver on each cross member extending to one side of the associated fulcrum axis;
hull engaging members on each of the cross members, laterally spaced from the associated keel receiver;
gimbal means between the hull engaging members and cross members, mounting the hull engaging members for pivotal motion about first pivot axes arranged parallel to the fulcrum axes, and second pivot axes perpendicular to the fulcrum axes, to enable flush contact with a variety of boat hull configurations by the hull engaging member, the gimbal means including longitudinal displacement means for permitting longitudinal movement of the hull engaging members relative to the boat trailer frame;
wherein the first pivot axes of the gimbal means are spaced from the respective fulcrum axes opposite the respective keel receivers such that the weight of a boat hull received on the hull engaging members and keel receivers is proportioned according to the respective distances of the hull engaging members and keel receivers from the respective fulcrum axes to thereby effect the percentage of the load carried by the keel receivers and associated hull engaging members;
wherein the gimbal means include forward gimbals and rearward gimbals, and wherein the forward gimbals include paired gimbal brackets connected by first and second pivot pins respectively defining the first and second pivot axes, mounting the hull engaging members to the associated cross member; and
wherein the longitudinal displacement means comprises longitudinal slots formed in the gimbal brackets, for receiving the first pivot pins and to permit longitudinal deflection of the bunk members.

17. A weight distributing hull and keel support for an elongated boat trailer frame, comprising:
a pair of cross members mounted to the boat trailer frame for pivotal movement thereon about first and second fulcrum axes transverse to the boat trailer frame and spaced apart longitudinally thereon;
a keel receiver on each cross member extending to one side of the respective fulcrum axis;
a pair of elongated flexible bunk members extending longitudinally relative to the boat trailer frame; and
mounting means for pivotally connecting the bunk members to the cross members, the mounting means including longitudinal displacement means for permitting longitudinal motion of the bunk members relative to the boat trailer frame.

18. A weight distributing hull and keel support for a boat trailer frame as claimed by claim 17, wherein the mounting means comprises a pair of gimbal means on each cross member for allowing pivotal movement of the bunk members relative to the cross members about two axes transverse to one another.

19. A weight distributing hull and keel support for a boat trailer frame as claimed by claim 17, wherein the mounting means comprises a pair of gimbal means on each cross member, with each gimbal means mounting an end of a bunk member to a cross member such that the bunk members extend longitudinally between the cross members for deflection about the fulcrum axes and for deflection about first pivot axes arranged parallel to the fulcrum axes, and second pivot axes perpendicular to the fulcrum axes; and
wherein the first pivot axis of each gimbal means is spaced from the respective fulcrum axis of the associated cross member to a side thereof opposite the respective keel receiver of the associated cross member such that the weight of a boat hull received on the hull engaging bunk members and keel receivers will be proportional according to the respective distances of the first pivot axes and keel receivers from the respective fulcrum axes.

20. A weight distributing hull and keel support for a boat trailer frame as claimed by claim 17, wherein the mounting means comprises first and second sets of gimbal bracket pairs mounted between the bunk members and cross members to permit pivotal motion of the bunk members about pivot axes; and
wherein the longitudinal displacement means comprises slot means provided in one set of the gimbal bracket pairs for permitting longitudinal motion of the bunk members attached thereto.

21. A weight distributing hull and keel support for a boat trailer frame as claimed by claim 17, wherein the bunk members comprise:
rigid end channels mounted to the cross members for pivotal movement thereon; and
a flexible bar joining the rigid end channels together.

22. A weight distributing hull and keel support for a boat trailer frame as claimed by claim 17, wherein the bunk members comprise:
rigid end channels mounted to the cross members for pivotal movement thereon;
a flexible bar joining the rigid end channels together; and
wherein the flexible bar is affixed at one end to one of the rigid end channels and is slidably joined at a remaining end to the remaining rigid end channel.

23. A weight distributing hull and keel support for a boat trailer frame as claimed by claim 17, wherein the bunk members and the keel receivers are arranged with respect to the fulcrum axes to engage a boat hull and keel in such a manner that approximately sixty percent of the received boat weight is received by the hull engaging members and approximately forty percent of the received boat weight is received by the keel receivers.

24. A weight distributing hull and keel support for a boat trailer frame as claimed by claim 17, further comprising hull engaging rollers mounted to the bunk members.

25. A weight distributing hull and keel support for an elongated boat trailer frame, comprising:
a pair of cross members mounted to the boat trailer frame for pivotal movement thereon about first and second fulcrum axes transverse to the boat trailer frame and spaced apart longitudinally thereon;

a keel receiver on each cross member extending to one side of the respective fulcrum axis;

a pair of elongated flexible bunk members extending longitudinally relative to the boat trailer frame; and mounting means for (a) pivotally connecting the bunk members to the cross members on one sides of the fulcrum axes, the bunk members being pivotal about first pivot axes, and (b) connecting the keel receivers to the cross members on opposite sides of the fulcrum axes, the mounting means including longitudinal displacement means for permitting longitudinal motion of the bunk members relative to the boat trailer frame; and wherein the weight of a boat hull received on the bunk members and keel receivers is proportioned according to the respective distances of the bunk members and keel receivers from the respective fulcrum axes to thereby effect the percentage of the load carried by the keel receivers and associated bunk members.

26. A weight distributing hull and keel support for a boat trailer frame as claimed by claim 25, wherein the longitudinal displacement means comprises slot means for slidably connecting front ends of the bunk members to one of the cross members.

* * * * *